United States Patent
Barnes et al.

(10) Patent No.: US 10,357,843 B2
(45) Date of Patent: Jul. 23, 2019

(54) APPARATUSES AND METHODS FOR SCORING A GLASS ARTICLE

(71) Applicant: Corning Incorporated, Corning, NY (US)

(72) Inventors: Monty Eugene Barnes, Woodhull, NY (US); Dennis William Buckley, Painted Post, NY (US); Ritesh Satish Lakhkar, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 72 days.

(21) Appl. No.: 15/527,964

(22) PCT Filed: Nov. 17, 2015

(86) PCT No.: PCT/US2015/060968
§ 371 (c)(1),
(2) Date: May 18, 2017

(87) PCT Pub. No.: WO2016/081395
PCT Pub. Date: May 26, 2016

(65) Prior Publication Data
US 2018/0043458 A1    Feb. 15, 2018

Related U.S. Application Data

(60) Provisional application No. 62/081,879, filed on Nov. 19, 2014.

(51) Int. Cl.
*B23K 10/00* (2006.01)
*B23K 37/02* (2006.01)
(Continued)

(52) U.S. Cl.
CPC ............ *B23K 10/003* (2013.01); *B23K 10/00* (2013.01); *B23K 26/0869* (2013.01);
(Continued)

(58) Field of Classification Search
CPC .. B23K 10/003; B23K 10/00; B23K 26/0869; B23K 26/38; B23K 37/0235;
(Continued)

(56) References Cited

U.S. PATENT DOCUMENTS 5,018,817 A * 5/1991 Suzuki .................... G02B 6/25
385/49
5,475,196 A    12/1995 Lisec
(Continued)

FOREIGN PATENT DOCUMENTS

JP    2012126584 A    7/2012
WO   2009078043 A1    6/2009

OTHER PUBLICATIONS

"Ever Cut Glass With a Plasma Cutter"; Forum http://www.jalopyjournal.com/forum/showthread.php?t=149509; Downloaded Jun. 7, 2016.
(Continued)

*Primary Examiner* — Queenie S Dehghan
(74) *Attorney, Agent, or Firm* — Svetlana Z. Short; Michael A. Hood (57) ABSTRACT

Disclosed herein are methods and apparatuses for scoring a glass article, including positioning a plasma flame of a plasma torch and the glass article in close proximity to one another; and moving the plasma torch across a surface of the glass article to form at least one indentation in the surface, wherein the at least one indentation is formed from the plasma flame melting at least a portion of the glass surface to form a scoring line, without penetrating through a total thickness of the glass article.

14 Claims, 4 Drawing Sheets

(51) Int. Cl.
*B23K 37/04* (2006.01)
*B23K 26/08* (2014.01)
*B23K 26/38* (2014.01)
*C03B 33/033* (2006.01)
*C03B 33/08* (2006.01)
*B23K 103/00* (2006.01)

(52) U.S. Cl.
CPC .......... *B23K 26/38* (2013.01); *B23K 37/0235* (2013.01); *B23K 37/0408* (2013.01); *C03B 33/033* (2013.01); *C03B 33/08* (2013.01); *B23K 37/0211* (2013.01); *B23K 2103/50* (2018.08); *B23K 2103/54* (2018.08)

(58) Field of Classification Search
CPC ............ B23K 37/0408; B23K 37/0211; B23K 2103/50; B23K 2103/54; C03B 33/033; C03B 33/08
See application file for complete search history.

(56) References Cited

U.S. PATENT DOCUMENTS

| | | | |
|---|---|---|---|
| 7,367,114 B2 | 5/2008 | Rybka et al. | |
| 2004/0045319 A1* | 3/2004 | Schussler | C03B 23/043 65/34 |
| 2005/0043186 A1* | 2/2005 | Maekawa | B05B 17/0607 505/450 |
| 2007/0151962 A1* | 7/2007 | Doll | C03B 33/091 219/121.72 |
| 2007/0228616 A1* | 10/2007 | Bang | B23K 26/046 264/405 |
| 2009/0126403 A1 | 5/2009 | Abramov et al. | |

OTHER PUBLICATIONS

"Using Plasma Cutter to Cut Other Materials"; http://www.millerwelds.com/resources/communities/mboard/showthread.php?11428-using . . . ; Downloaded Nov. 7, 2014; 7 Pages; Miller.

Akashi et al; "Deep Reactive Ion Etching of Borosilicate Glass Using an Anodically Bonded Silicon Wafer as an Etching Mask"; Journal of Micromechanics and Microengineering; May 2006, vol. 16, No. 5 pp. 1051-1056.

International Search Report and Written Opinion of the International Searching Authority; PCT/US2015/060968; dated Jan. 19, 2016; 7 Pages; ISA/US Commissioner for Patents.

\* cited by examiner

APPARATUSES AND METHODS FOR SCORING A GLASS ARTICLE

This application claims the benefit of priority to International Application No. PCT/US2015/060968, filed on Nov. 17, 2015, which claims the benefit of priority to U.S. Application No. 62/081879, filed on Nov. 19, 2014, the content of each of which is incorporated herein by reference in its entirety.

FIELD OF THE DISCLOSURE

The disclosure relates generally to apparatuses and methods for scoring a glass article, and more particularly to apparatuses and methods for scoring a glass article using plasma.

BACKGROUND

Many applications require glass that has been strengthened, for example in consumer and commercial electronic devices such as LCD and LED displays, computer monitors, automated teller machines (ATMs) and the like. Various processes may be used to strengthen the glass, including chemical tempering, thermal tempering, and lamination.

For example, in an ion exchange strengthening process, ions in the surface layer of the glass are replaced by, or exchanged with, larger ions in a bath solution (such as a salt bath) having the same valence or oxidation state. Lamination mechanical glass strengthening is a mechanism whereby two or more layers of glass having different coefficients of thermal expansion (CTE) are bonded or laminated. For example, in a laminate of three layers, i.e. a core layer surrounded by two clad layers, the relatively higher CTE of the core glass layer compared to the CTE of the clad glass layers causes the core glass layer to contract or shrink more than the clad glass layers upon cooling following thermal bonding. This causes the core glass layer to be in a state of tension and the clad glass layers to be in state of compression. The compressive stresses in the clad glass layers inhibit fracture formation and fracture propagation in the clad glass layers, thereby strengthening the glass laminate compared to clad glass that is not under compressive stresses. The laminate may also be thermally tempered to increase the compressive stress in the clad glass.

The manufacture of glass with increasingly higher strength poses challenges where cutting and separation of such glass is desired. Conventional glass cutting and separating methods, such as the use of score wheels for cutting and lasers and microwaves for separating, may not be sufficient for certain strengthened glass. For example, the use of score wheels employs a method whereby an indentation is created in the glass surface and the indentation is used to break or separate the glass along a path corresponding to the indentation. Applying pressure with a scoring wheel to create indentations in the strengthened glass surface has drawbacks, however, as the score wheels wear-out, which increases costs, and may even damage the glass or severely limit the edge strength of the glass once separated.

As such, it would be advantageous to provide new apparatuses and methods for scoring glass, for example strengthened glass articles such as laminate glass sheets.

SUMMARY

This disclosure relates, in various embodiments, to methods for scoring glass articles, said methods comprising (a) positioning a plasma torch and the glass article in close proximity to one another; and (b) moving a plasma flame generated by the plasma torch across a surface of the glass article in order to form at least one indentation in the surface, wherein the at least one indentation is formed from the plasma flame melting at least a portion of the surface of the glass article to form a scoring line, without penetrating through a total thickness of the glass article. In at least certain embodiments, the glass article is a chemically or mechanically strengthened glass, such as a glass laminate.

Further embodiments relate to scoring a glass article, comprising (a) positioning a plasma torch and the glass article in close proximity to one another; (b) moving the plasma torch across a surface of the glass article in order to form at least one indentation in the surface to form a scoring line, and (c) cutting or separating the glass article at the scoring line, wherein the at least one indentation is formed from a plasma flame generated by the plasma torch melting at least a portion of the glass surface without penetrating through a total thickness of the glass article. In at least certain embodiments, the glass article is a chemically or mechanically strengthened glass, such as a glass laminate.

Yet further embodiments relate to strengthened glass or glass structures comprising a glass article having a surface, wherein a portion of the surface includes an indentation formed by a plasma torch.

Additional features and advantages of the disclosure will be set forth in the detailed description that follows, and in part will be readily apparent to those skilled in the art from that description or recognized by practicing the methods as described herein, including the detailed description that follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

BRIEF DESCRIPTION OF THE DRAWINGS

The following detailed description can be best understood when read in conjunction with the following drawings, where like structures are indicated with like reference numerals and in which.

DETAILED DESCRIPTION

Disclosed herein are methods and apparatuses for scoring glass articles such as, for example, thermally tempered, chemically strengthened, or laminate glass sheets. The methods may include positioning a plasma torch and the glass article in close proximity to one another, and moving the plasma torch across a surface of the glass article to impart at least one indentation in the surface. The at least one indentation is formed from a plasma flame of the plasma torch melting the surface of the glass article, without penetrating through a total thickness of the glass article.

The term "glass article" as used herein refers to a particular item or object made of glass, ceramics, glass-ceramics, or combinations thereof, including hardened glass, such as by chemical, temperature, pressure, or other treatment, a single-layered glass sheet, glass laminates comprising a plurality of glass layers, glass composites, or other glass constructs.

The term "plasma torch" as used herein refers to a device configured to generate and emit a direct flow of plasma, referred to herein as a "plasma flame." The plasma torch may generate an electric arc between electrodes. The electric arc may be configured to ignite a working fluid, which is transformed into the plasma flame made to project outwardly from the plasma torch.

The term "indentation" as used herein refers to a shallow crack, recess, notch, incision, gash, depression, cut, or other disruption of the surface of a glass article. In at least certain embodiments, the indentation may be elongated, e.g. along a plane in a direction of movement of either the glass article or the plasma flame, although in other embodiments the indentation may not be elongated.

As used with respect to the methods described herein, the terms "score" and "scoring" by the plasma torch are intended to indicate melting at least a portion of the glass surface, rather than mechanical cutting or scratching of the surface. The melting creates an indentation in the surface of the glass article. In various embodiments, the indentation or melting of the glass article does not extend all the way through a total thickness of the glass article. Thus, a depth of the indentation is less than a thickness of the glass article. The indentation may form a separation line for cutting the glass article. The separation line formed by scoring with the plasma torch may be straight, curved, or almost any shape or pattern to form a desirable edge shape.

As used herein, the phrase "close proximity" is meant to convey that the plasma torch and glass article are sufficiently near to each other for the plasma flame to have a desired melting effect on the glass, but not necessarily in contact, although contact between the plasma flame and the glass article may occur in various embodiments.

Figure 1A:
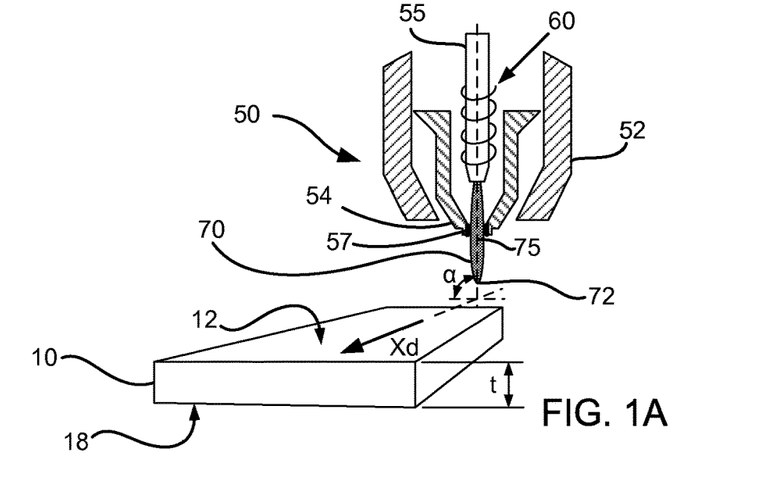
FIGS. 1A-1C are a series of perspective views with partial cross-section of a plasma torch in three positions, according to exemplary methods of scoring glass.
Figure 1B:
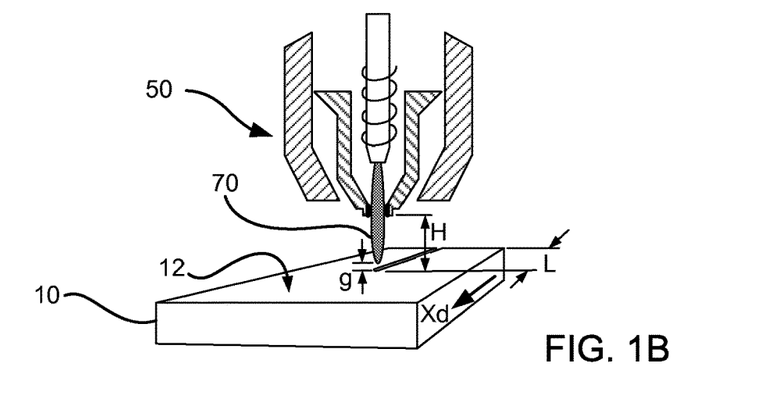
Figure 1C:
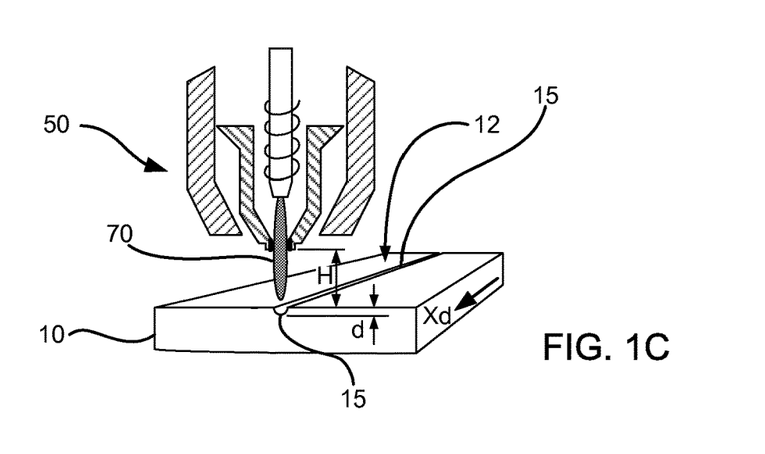

FIGS. 1A-1C illustrate exemplary methods of scoring a glass article 10 using a plasma torch 50. According to various embodiments, the glass article 10 may comprise a laminate structure formed by two or more layers of glass bonded together. For example, the glass article 10 comprises a laminated sheet comprising a plurality of glass layers. The laminate glass sheet can be substantially planar (e.g., a flat sheet) or non-planar (e.g., a curved sheet). In some embodiments, the laminate glass sheet comprises a core layer disposed between a first cladding layer and a second cladding layer. The first cladding layer and the second cladding layer can be fused to opposing major surfaces of the core layer. In such embodiments, the interfaces between each of the first cladding layer and the second cladding layer and the core layer are free of any bonding material such as, for example, an adhesive, a coating layer, or any non-glass material added or configured to adhere the respective cladding layers to the core layer. Thus, the first cladding layer and the second cladding layer are fused directly to the core layer or are directly adjacent to the core layer. In some embodiments, the laminate glass sheet comprises one or more intermediate layers disposed between the core layer and the first cladding layer and/or between the core layer and the second cladding layer. For example, the intermediate layers comprise intermediate glass layers and/or diffusion layers formed at the interface of the core layer and the cladding layer (e.g., by diffusion of one or more components of the core and cladding layers into the diffusion layer). In some embodiments, the laminate glass sheet comprises a glass-glass laminate (e.g., an in situ fused multilayer glass-glass laminate) in which the interfaces between directly adjacent glass layers are glass-glass interfaces. In these or other embodiments, the glass article 10 may comprise a glass sheet that has been chemically strengthened and/or thermally tempered.

Exemplary methods described herein may discuss the plasma torch 50 being moved in a working direction Xd relative to the glass article 10, but it should be understood that this is for ease of reference only and alternate embodiments may include methods where the glass article 10 is moved rather than the plasma torch 50, or where the glass article 10 is moved in an opposite direction relative to movement of the plasma torch 50.

The glass article 10 may comprise a working surface 12 and an opposed back surface 18 defining a thickness t. While the working surface 12 is illustrated as a generally planar surface, the working surface 12 and/or the opposed back surface 18 need not be planar or even substantially planar. For example, the working surface 12 may be generally curved or comprise discrete portions that are curved or substantially non-planar. In addition, the thickness t of the glass article 10 is illustrated as being a constant thickness; however, the thickness t need not be constant. In some embodiments, the working surface 12 and/or the back surface 18 are free of a conductive layer added or configured to form an electric arc with the plasma torch.

According to various exemplary embodiments, the plasma torch 50 may be part of a fixed assembly or may be a portable tool. The same plasma torch 50 may be used in conjunction with numerous different types of glass and glass structures. The plasma torch 50 includes a housing 52 and a nozzle 54. Inside the housing 52, a cathode 55 may be charged with a current, such as a DC current, that is allowed to form an electric arc between the cathode 55 and an anode 57 inside the nozzle 54. A working fluid 60 is pressurized to exit the nozzle 54, passing through the electric arc, getting highly ionized in the process, and igniting to form a plasma flame 70 that emits from the nozzle 54. The working fluid 60 may be for example, oxygen, nitrogen, argon, helium, air, or hydrogen. In addition, the working fluid 60 may be a gas, a gel, or even a liquid, so long as it is fluid in nature. The energy of the plasma flame 70 and the corresponding temperatures generated are dependent upon the electrical power level employed to create the electric arc, as well as the pressure supplying the working fluid 60. For example, the plasma flame 70 may be associated with temperatures ranging from about 15,000° C. to about 18,000° C., although lower and higher temperatures may be achieved.

The composition of the glass article 10 may vary, but generally may include a glass transition temperature upwards of about 1000° C. to about 1500° C., or even as low as 620° C. for some strengthened glass like Gorilla® Glass, which is significantly lower than the temperature of the plasma flame 70. Considering the temperatures surrounding the plasma flame 70 may be an order of magnitude higher than the transition temperature of the glass article 10, within a fraction of a second of being exposed to those temperatures, the working surface 12 will be heated beyond the transition temperature of the glass article 10. In addition, even in complex composite and laminate glass, the extreme temperatures of the plasma flame 70 will melt and possibly even vaporize crystalline or semi-crystalline solids therein. Thus, the temperatures emitted by the plasma flame 70 will very quickly turn previously solid areas of the working surface 12 into a molten state.

Once an area of the working surface 12 achieves the molten state, the change in the area may create at least one indentation in the plane of the working surface 12. The at least one indentation in the working surface 12 may be associated with changes in surface texture, contour, color, and/or clarity. A continuous series of such indentations may form a long, shallow groove in the working surface 12, such as, for example, along substantially the entire working surface 12 in a working direction Xd. Thus, the at least one indentation may comprise several discontinuous indentations, for example, substantially in a line, or may comprise one continuous, elongated indentation that traverses substantially an entire working surface 12 of the glass article, in at least one direction.

In FIG. 1A, the glass article 10 and the plasma torch 50 are illustrated as being in close proximity to one another. Ignition of the plasma torch 50 emits the plasma flame 70, having a generally identifiable tip 72. The projecting plasma flame 70 may not initially be aligned over the glass article 10, in order to avoid an initial burst of plasma flame 70 that is more or less intense than desired. In addition, an orientation angle α of a central axis 75 of the plasma flame 70 may be established relative to the plane in which the working surface 12 lies. As a non-limiting example, the orientation angle a may be about 90° (i.e., the central axis 75 oriented perpendicular to the working surface 12). In order to form substantially similar indentations in the working surface 12, the orientation angle a may be maintained substantially constant as the plasma torch 50 is moved across the working surface 12 in a working direction Xd.

Thus, once positioned as desired and with a plasma flame 70 emitting from the plasma torch, the plasma flame 70 emitted by the plasma torch 50 may be moved in a working direction Xd at a substantially steady speed across the glass article 10. The speed of movement may control a maximum duration the plasma flame heats discrete portions of the surface, and thus, it may be desirable to choose the speed relative to variables such as the type and thickness of the glass article, and the desired depth d of indentations. It also may be desirable to maintain a substantially constant speed, to create substantially even and consistent indentations along the working surface 12 in the working direction Xd, although this is not required. During the movement across the working surface 12, the orientation angle a between the central axis 75 and the working surface 12 may also optionally be maintained substantially constant, which may aid in forming substantially even and consistent indentations, where desired.

In FIG. 1B, the plasma flame 70 is illustrated as having traversed midway across the glass article 10, a length L. As shown in FIG. 1B, according to various exemplary embodiments, a gap g may optionally be maintained between the generally identifiable tip 72 and the working surface 12 while the plasma flame 70 moves across the working surface 12. The size of the gap g, may, according to various embodiments, be inversely proportional to the size of the indentations created, keeping all other variables constant. The gap g may be maintained substantially constant by regulating a height H, which measures the distance between a tip of the nozzle 54 and the working surface 12. In this way, the height H is an optional control variable that can be chosen to influence a rate of heat exposure on the working surface 12. Another optional control variable is the speed at which the plasma torch 50 is moved across the working surface 12, as discussed above. As also mentioned above, further control variables can include the power level and/or pressure forming the plasma flame 70. In this way, the power level and/or pressure forming the plasma flame 70 may be adjusted in order to increase or decrease the size, including the depth d, of indentations formed in the working surface 12.

In FIG. 1C, the plasma flame 70 is illustrated as having traversed an entire length of the glass article 10, leaving an elongate indentation 15 forming a separation line. A non-limiting embodiment of the elongate indentation 15 is a groove, having a depth d, and extending substantially across the entire working surface 12, as depicted in FIG. 1C. In this way, the plasma torch 50 forms an elongate indentation in the working surface 12 without cutting through a complete thickness t of the glass article 10. The depth d may be controlled by choosing appropriate parameters for the gap g and the speed at which the plasma torch 50 is moved across the working surface 12. Maintaining a minimum distance (e.g., height H) between the plasma torch and the surface may control a depth of the indentation in the surface. In addition, maintaining a minimum speed may ensure the plasma flame 70 does not cut through a complete thickness t of the glass article 10. The depth d has an inverse relation to the speed at which the plasma torch 50 is moved, assuming a power and/or pressure level generating the plasma flame 70 is substantially constant. For example, the slower the plasma torch 50 is moved, the deeper the depth d of the groove that is formed. A desirable minimum speed and minimum distance may be known values, influenced by the process variables, as well as the central tension and other characteristics of the glass article, determined through mapping exercises using controlled parameters.

Crack propagation relative to the creation of the indentation in the working surface 12 using the plasma torch 50 may be dissimilar to that seen when using conventional methods, such as score wheels. In particular, a score wheel generally creates small vent cracks extending deeper into the glass article 10, beyond the bottom of the groove formed by the score wheel.

Figure 2:
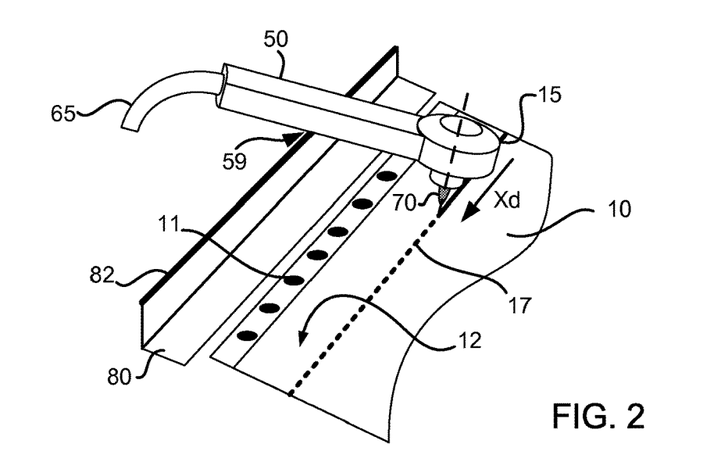
FIG. 2 is a perspective view of a plasma torch on a guide scoring glass in accordance with exemplary methods of the disclosure.

FIG. 2 illustrates a non-limiting example of the method of scoring the glass article 10, with the plasma torch 50 in the process of moving across the glass article 10. According to various embodiments, the plasma torch 50 may be a handheld device, for example tethered by a power and/or working gas supply line 65 as shown. A handheld device may offer flexibility and convenience. For example, a handheld device may be applied to oversized or oddly shaped glass and glass structures that might not otherwise fit in a fixed work station frame.

As described above, the plasma torch 50 may be moved across the glass article 10 in the working direction Xd. In at least certain embodiments, a user holding the plasma torch 50 may maintain a minimum speed to avoid cutting through a complete thickness t of the glass article 10. A temporary score line 17 may optionally be drawn on the working surface 12, such as with a marker, in order to guide where to point the plasma flame 70 while forming the indentation(s) 15. In addition, the free wielding nature of the handheld device may make it difficult to maintain a constant distance between the plasma torch 50 and the working surface 12, which may be useful to form a groove with a substantially consistent depth. Accordingly, a guide mechanism 80 optionally may be provided, for example in the form of a guide fence with a top rail 82 as shown in FIG. 2. By sliding a portion 59 of the plasma torch 50 along the top rail 82, while moving across the glass article 10, a substantially constant distance of the plasma flame to the glass article 10 may be achieved, and a corresponding substantially constant indentation depth may be achieved.

In this way, the plasma torch 50 may be used for quickly forming a separation line in various applications. For example, the separation line may be formed for cutting the glass article 10 to an approximate size before final sizing, for cutting off knurled edges 11 off the glass article 10, or removing an otherwise unwanted portion of the glass article 10 (e.g., glass beaded areas, including beads or knurls on the draw in the ribbon). In addition, scoring the glass article 10 using the plasma torch 50 may provide temporary stress relaxation in the glass, wherein the temporary stress relaxation facilitates separation of the glass article along an extent associated with the indentation(s) during a subsequent bend-break separation.

Figure 3A:
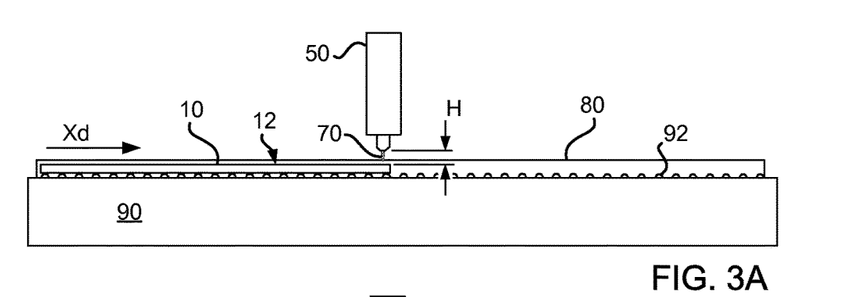
FIGS. 3A-3C are a series of elevated side views of a plasma torch in stages of the process of scoring glass, according to exemplary methods of the disclosure.
Figure 3B:
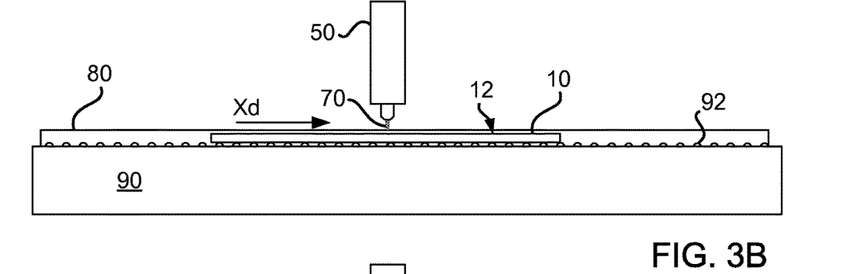
Figure 3C:
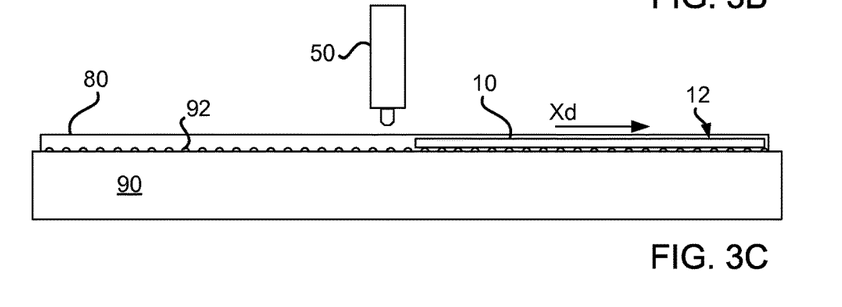

FIGS. 3A-3C illustrate a non-limiting example of a method of scoring the glass article 10. In this embodiment, the plasma torch 50 is moved across the glass article 10, but the plasma torch 50 remains stationary while the glass article 10 is moved. In this exemplary and non-limiting embodiment, the plasma torch 50 may be incorporated into, or held in-place relative to, a fixed workstation assembly 90, which remains stationary. An exemplary fixed workstation assembly 90 may optionally include a conveying mechanism 92. The conveying mechanism 92 is illustrated as including a set of rollers for supporting and moving the glass article 10, but any known method for moving the glass article 10 may be chosen. For example, the conveying mechanism may include a sheet of air, or other low friction surface for conveying the glass article 10 in the working direction Xd. In addition, an optional guide mechanism 80, such as a guide rail, may control a position of the glass article 10 as it is conveyed. The rate at which the glass article 10 is conveyed equals the speed at which the plasma torch 50 is moved across the working surface 12.

One advantage of the fixed workstation assembly 90 is that once the height H and power/pressure settings of the plasma torch 50 are set, and the guide mechanism 80 appropriately positioned (if adjustable), numerous discrete pieces or structures of glass article 10 may be quickly passed through the fixed workstation assembly 90. There thus may be no need for a temporary score line marker and the relative position of the plasma flame 70 may be more precisely controlled. In this way, the fixed workstation assembly 90 may provide consistent repeatability in scoring the glass article 10, and thus may be suitable for high-volume production environments.

In FIG. 3A, the glass article 10 has just started to pass the plasma flame 70. In FIG. 3B, the glass article 10 is about half way finished passing the plasma torch 50. In FIG. 3C, the glass article 10 has fully passed the plasma torch 50 and the plasma flame 70 has been turned off. Thereafter, the glass article 10 may be further handled for separating portions thereof along an extent associated with the indentation(s) created in accordance with the various embodiments.

Figure 4A:
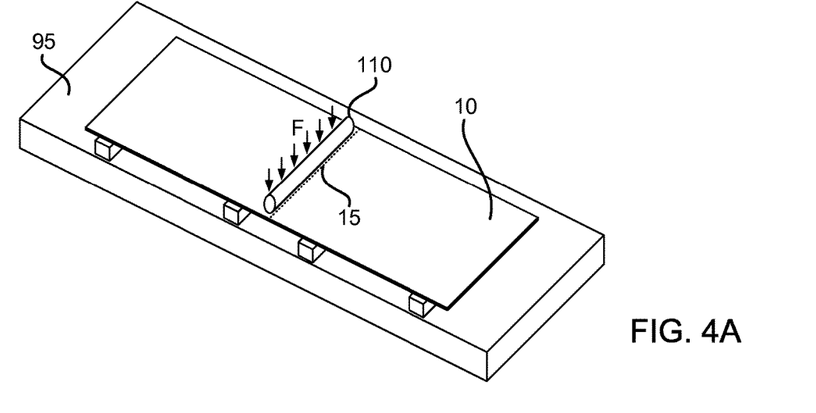
FIGS. 4A-4B are perspective views of glass being cut into two pieces by a breaker bar along a score line generated by scoring with a plasma torch, according to exemplary methods of the disclosure.
Figure 4B:
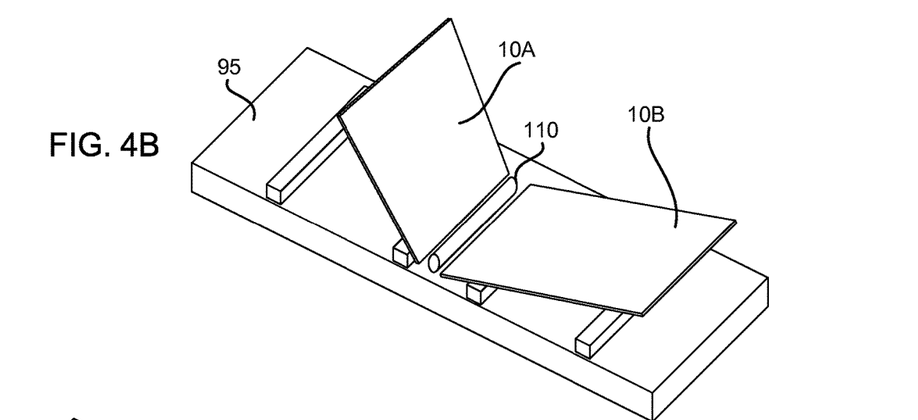

FIGS. 4A-4B illustrate an exemplary method of cutting a glass article 10 that has already been scored using a plasma torch 50 in accordance with various embodiments. In FIG. 4A, the glass article 10, with the indentation(s) 15 already formed therein, is optionally held by a retaining structure 95. The retaining structure 95 may be useful to hold or position the scored glass, such as, for example, a worktable with elevation blocks simply supporting the glass article 10, although it should be noted that in alternate embodiments, no retaining structure is employed. Alternatively, the retaining structure 95 may hold the glass article 10 with clamps, straps, or other means. The glass article 10 optionally may be held by the retaining structure 95 in a non-horizontal configuration. Once the glass article 10 is held on the retaining structure 95, a breaker bar 110 is aligned with the indentation(s) 15 and brought into contact with the glass article 10. By applying a force F using the breaker bar 110 on the indentation(s) 15, the force F may be evenly distributed to cleanly separate the glass article 10 into two pieces. In FIG. 4B, two separate pieces 10A, 10B have been formed from the glass article 10, which was separated along the indentation(s) 15, as described with regard to FIG. 4A. Opposite ends of the two pieces 10A, 10B are illustrated as significantly elevated to emphasize the bend/break reaction to the breaker bar 110 pushing down at the point of separation. The indentation(s) 15 may provide the glass article 10 with a temporary stress relaxation, which may facilitate separation of the two separate pieces 10A and 10B.

According to at least certain exemplary and non-limiting embodiments, the methods described herein may be useful for forming a "rough" scoring line in the glass for more precise subsequent glass cutting. In various embodiments, for example, a further step of cutting or separating the scored glass at approximately the scoring line may be performed by any method known.

Figure 5:
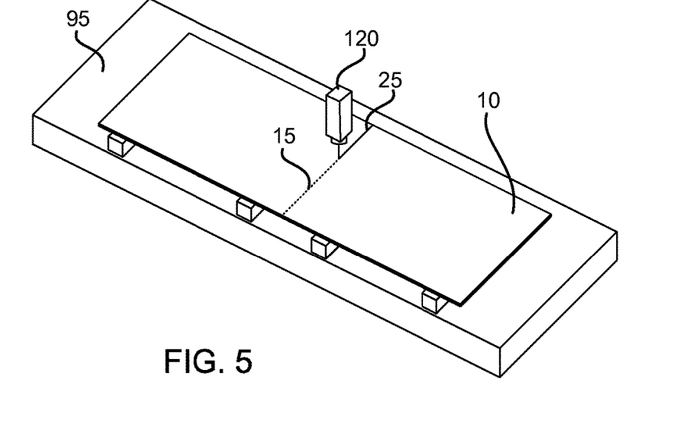
FIG. 5 is a perspective view of glass being cut into two pieces by a laser along a score line generated by scoring with a plasma torch, according to exemplary methods of the disclosure.

By way of example only, FIG. 5 illustrates an exemplary method of cutting a glass article 10 that has been scored using a plasma torch 50 in accordance with various exemplary embodiments. Once again, the glass article 10, with the indentation(s) 15 already formed therein, is held by a retaining structure 95. Once the glass article 10 is held on the retaining structure 95, a laser 120 may be used to create a cut 25 through the entire thickness of the glass article 10. A beam of the laser 120 may have an output power sufficient to cause ablation of the glass article 10 as it is moved across the indentation(s) 15. The laser 120 may be any laser with sufficient capacity to cut through the scored glass. For example, the laser 120 may comprise a neodymium-doped yttrium aluminum garnet (YAG) or a neodymium-doped yttrium orthovanadate (YVO4) laser. The indentation(s) 15 may provide the glass article 10 with a temporary stress relaxation for facilitating separation into two separate pieces. Unlike the plasma torch 50 described above, the laser 120 may need to pass over the glass article 10 at a much slower speed, since the laser ablation occurs more slowly than the plasma heat causes the glass to transition into a molten state.

Alternatively, any other known method of cutting, breaking, or separating the glass article may be used, once the glass article is scored with the plasma torch, since the scoring line allows for relatively easier or cleaner cutting, breaking, or separating, relative to glass or glass structures not scored according to methods described herein. For example, a plasma scored glass article may self-separate or be separated by hand, by a robot, or other mechanical separation technique.

In yet further embodiments, glass that has been either chemically or mechanically strengthened, and that is scored according to various exemplary methods herein, is described.

It will be appreciated that the various disclosed embodiments may involve particular features, elements, or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a sheet" includes examples having two or more such "sheets" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature may be approximately that described. For example, a "substantially planar" surface is intended to denote a surface that is nearly planar.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to an apparatus that comprises A+B+C include embodiments where an apparatus consists of A+B+C and embodiments where an apparatus consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

The following Example is intended to be non-restrictive and illustrative only, with the scope of the invention being defined by the claims.

EXAMPLE

A composition of the glass article 10, as well as its thickness t, may influence how deep an indentation should be to be an effective score line. The plasma scoring methods of various embodiments herein have been demonstrated to work on strengthened laminate glass structures having a thickness t of approximately 4 mm. Similar results may be achieved for ion exchanged glass, such as Corning® Gorilla® glass from Corning Incorporated, having a thickness t of approximately 0.2 mm thickness. An exemplary glass article 10 may have a thickness ranging from about 0.2 mm to about 1.5 mm, a core-clad ratio (i.e., a ratio of a thickness of the core layer to a total thickness of the clad layer or layers) ranging from about 2 to about 9, and a central tension of at least about 5 MPa.

In addition, a speed of movement at which the plasma flame is moved relative to the glass article may control the size of the indentations formed therein by the plasma flame. Speeds ranging from about 150 mm/sec to about 2000 mm/sec, for example about 1500 mm/sec, may be used for the plasma scoring methods of various embodiments.

Figure 6:
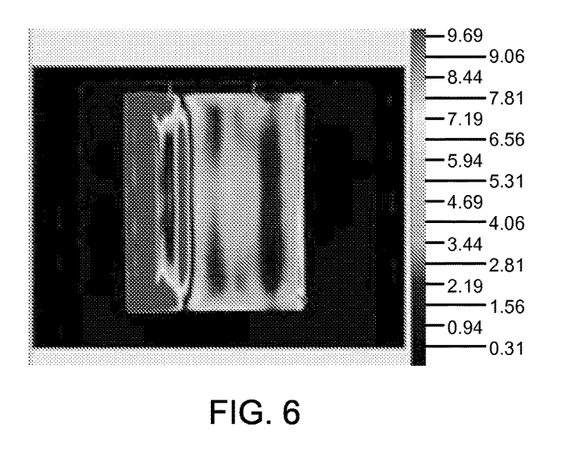
FIG. 6 shows stress patterns in glass separated after being scored with a plasma torch, according to exemplary methods of the disclosure.

FIG. 6 illustrates stress patterns in a glass article separated after being scored with a plasma torch according to an embodiment of the disclosure. The gray-scale gradient measures the maximum shear stress in the various portions of an illustrative cut edge. The level of maximum shear stress is graded by the scale on the right, which is measured through retardance in nanometers (nm). The illustrated edge stress patterns demonstrate that there is little or no residual stress or undesirable side effects of using plasma scoring techniques in accordance with the various embodiments disclosed herein, at least as compared to mechanical scoring techniques.

Figure 7:
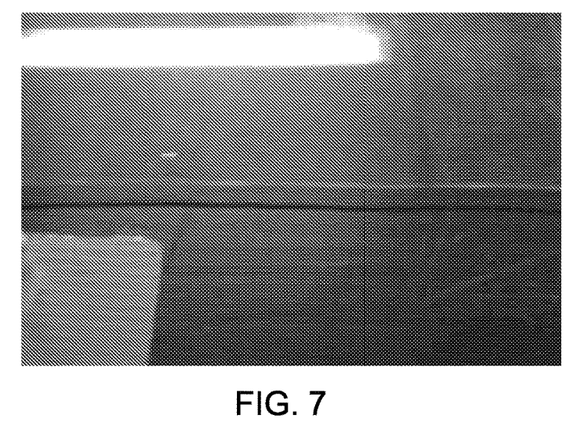
FIG. 7 shows a cut edge of glass separated after being scored with a plasma torch, according to exemplary methods of the disclosure.

FIG. 7 is an image of an exemplary cut edge of a glass article separated after being scored with a plasma torch according to an embodiment of the disclosure. The image in FIG. 7 illustrates how a good smooth edge quality may be achieved using the plasma scoring techniques in accordance with the various embodiments disclosed herein. In particular, there is a lack of artifacts, such as hackle or shark teeth (which are commonly observed in contemporary mechanical scoring and separation methods). In this way, the good smooth edge quality demonstrated in FIG. 7 may demonstrate a superior edge quality that may be achieved using the various embodiments herein.

Figure 8:
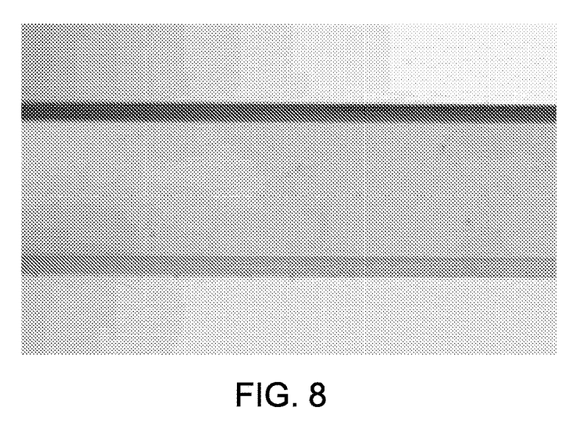
FIG. 8 shows a magnified cross-sectional view of glass after being scored with a plasma torch, according to exemplary methods of the disclosure.

FIG. 8 is an image of a magnified cross-sectional view of a laminate glass structure after being scored with a plasma torch according to an embodiment of the disclosure. The image in FIG. 8 illustrates how a good smooth edge quality may be achieved using the plasma scoring techniques on laminate glass structures in accordance with the various embodiments disclosed herein. Once again, there is a lack of artifacts, such as hackle or shark teeth. In this way, the good smooth edge quality demonstrated in FIG. 8 may demonstrate a superior edge quality that may be achieved using the various embodiments herein.

What is claimed is:

1. A method for scoring a glass article, the method comprising:
   (a) positioning a plasma torch and the glass article in close proximity to one another; and
   (b) moving a plasma flame generated by the plasma torch across a surface of the glass article to form at least one indentation in the surface,
   wherein the at least one indentation is formed from the plasma flame melting at least a portion of the surface of the glass article to form a scoring line, without penetrating through a total thickness of the glass article.

2. The method of claim 1, wherein moving the plasma torch across the surface of the glass article comprises maintaining a minimum speed of the plasma torch movement, wherein the minimum speed controls a maximum duration the plasma flame heats discrete portions of the surface of the glass article.

3. The method of claim 1, wherein the at least one indentation comprises substantially continuous indentations forming a groove in the surface of the glass article, and further wherein the groove has a depth that is controlled at least partially by a predetermined speed of the plasma torch.

4. The method of claim 1, wherein moving the plasma torch across the surface of the glass article comprises maintaining a minimum gap between the plasma flame and the surface of the glass article, and further wherein the minimum gap at least partially controls a depth of the at least one indentation in the surface.

5. The method of claim 1, wherein moving the plasma torch across the surface of the glass article comprises maintaining the plasma flame at an angle of approximately 90° relative to the surface of the glass article.

6. The method of claim 1, wherein the scoring line in the glass article is a straight line.

7. The method of claim 6, further comprising cutting the scored glass article at the scoring line.

8. The method of claim 7, wherein forming the at least one indentation provides a temporary stress relaxation in the glass article, and wherein the temporary stress relaxation facilitates cutting the scored glass article at the scoring line.

9. A method for cutting or separating a glass article, comprising:
   (a) positioning a plasma torch and the glass article in close proximity to one another;
   (b) moving the plasma torch across a surface of the glass article to form at least one indentation in the surface to form a scoring line, and
   (c) cutting or separating the glass article at the scoring line,
   wherein the at least one indentation is formed from a plasma flame generated by the plasma torch melting at least a portion of the glass surface without penetrating through a total thickness of the glass article.

10. The method of claim 9, wherein moving the plasma torch across the surface of the glass article comprises maintaining a minimum speed of the plasma torch movement, wherein the minimum speed at least partially controls a maximum duration the plasma flame heats discrete portions of the surface of the glass article.

11. The method of claim 9, wherein the at least one indentation comprises substantially continuous indentations forming a groove in the surface of the glass article, and further wherein the groove has a depth and the depth is at least partially controlled by a predetermined speed.

12. The method of claim 9, wherein moving the plasma torch across the surface of the glass article comprises maintaining a minimum gap between the plasma flame and the surface of the glass article, and further wherein the minimum gap at least partially controls a depth of the at least one indentation in the surface.

13. The method of claim 9, wherein moving the plasma torch across the surface of the glass article comprises maintaining the plasma flame at an angle of approximately 90° relative to the surface of the glass article.

14. The method of claim 9, wherein forming the at least one indentation provides a temporary stress relaxation in the glass article, and wherein the temporary stress relaxation facilitates cutting or separating the glass article at the scoring line.

* * * * *